Patented Jan. 5, 1937

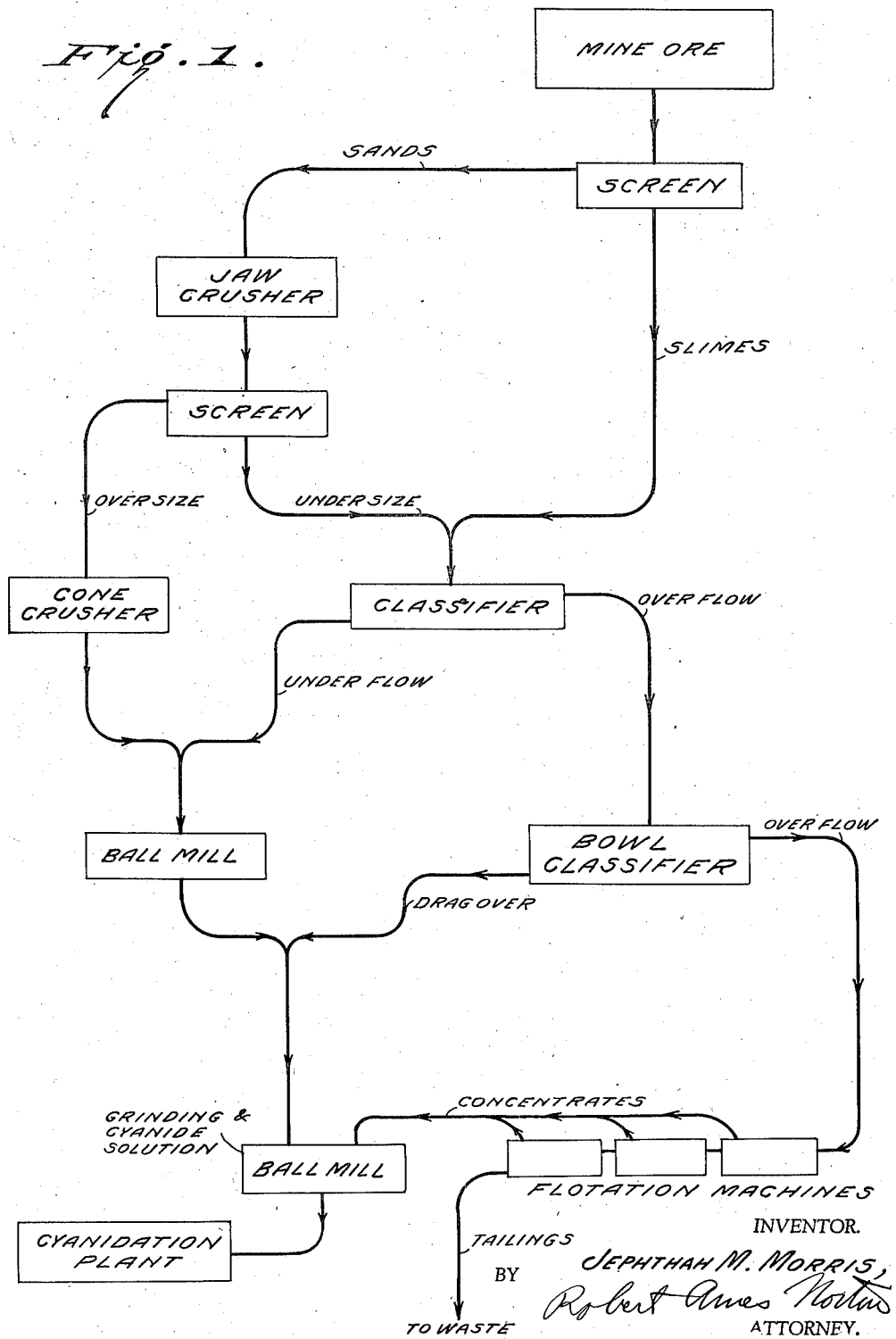

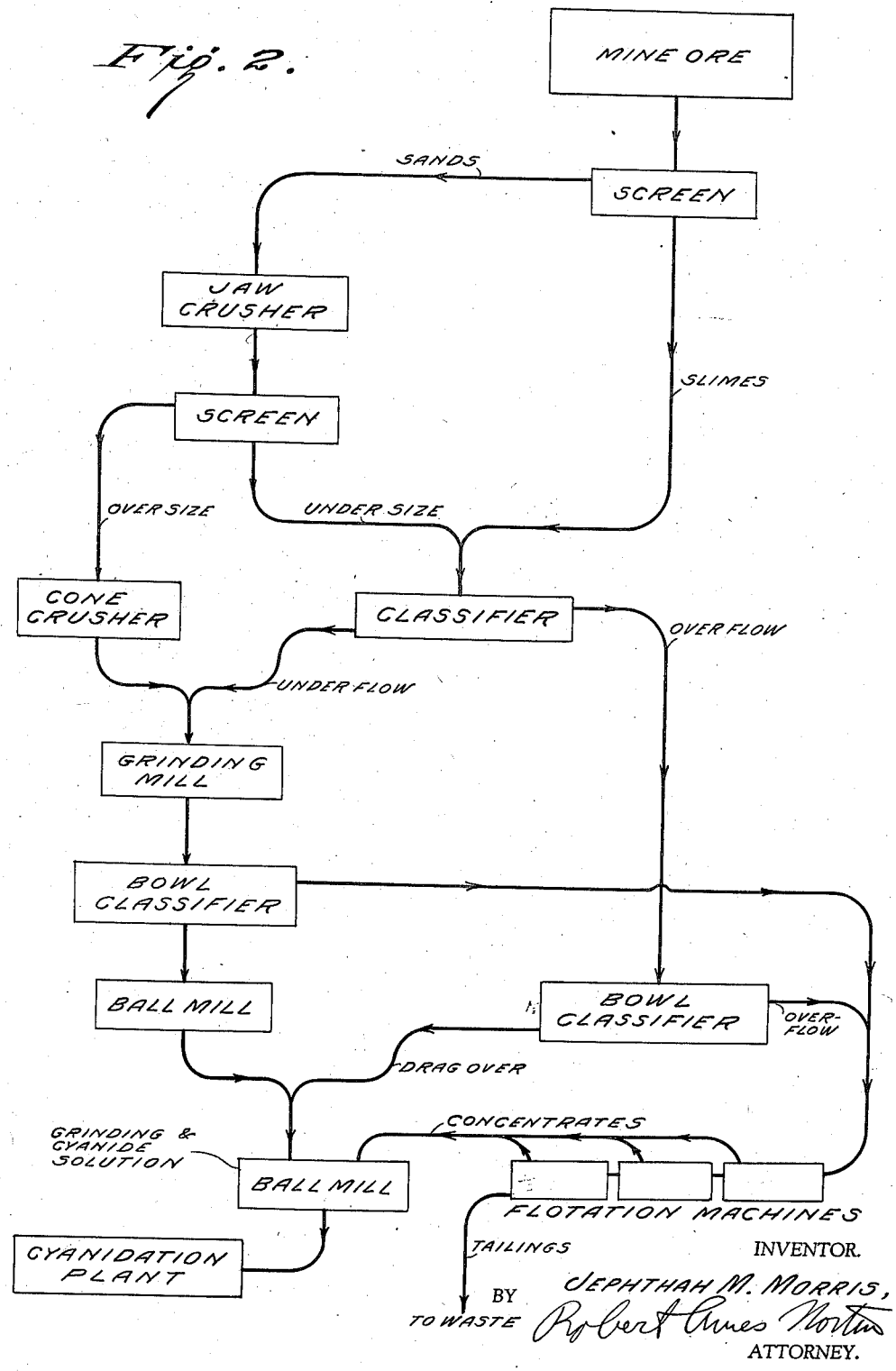

2,067,014

UNITED STATES PATENT OFFICE 2,067,014

CYANIDATION AND FLOTATION OF ORES

Jephthah M. Morris, Baguio, P. I., assignor to Benguet Consolidated Mining Co. S. A., Manila, P. I., a corporation of Philippine Islands Application August 3, 1935, Serial No. 34,631

8 Claims. (Cl. 75—2)

This invention relates to improvement in the cyanidation and flotation of ores, especially gold ores.

Some gold ores contain both sulfides and oxidized minerals and are far from homogeneous in structure, that is to say, they contain both hard and soft minerals, some of the latter frequently being relatively soluble in water and dilute alkaline solutions. These ores present a serious problem when it is attempted to extract the values by cyanidation. The soft material tends to form slimes when sufficient grinding is provided to reduce the harder minerals to the desired degree of fineness. The slimes, particularly if they contain soluble salts or are of a colloidal nature, cause serious frothing in the cyanide plant, which not only reduces the capacity of the cyanide plant, but a concentration of values in the froth takes place through evaporation and through the flotation action on certain sulfides in the ore. Colloidal slimes also tend to flocculate into gelatinous flocks when in contact with alkaline solutions which are always present in cyanidation and as this flocculation takes place in the presence of valuable solution, losses result because the entrained solution cannot be removed from these flocks by ordinary filtration. This results in a loss both of values and of cyanide from the pregnant solution. The flocculant material also tends to slow thickening, clog filter cloths and increase maintenance. Another serious loss results when the ores contain soluble salts which act as cyanicides and consume lime. Many of these soluble salts which act as cyanicides also tend to form gelatinous compounds which increase the frothing.

The present invention is based on a separation, either partial or complete, of the soft slime-forming material from the harder ore and the treatment of this separated portion by flotation preferably with return of flotation concentrates to the cyanide plant in which the harder portion of the ore is treated. The separation of the slimes may be at various points between the original ore and the actual treatment in the cyanide plant. Thus, with many ores such as, for example, gold ore found extensively in the Philippines, a very large proportion of the slimes are present in such a form that they are separated by crushing and washing. With some of these ores, therefore, it is desirable to effect slime separation at this point. Where, however, there is a large amount of soft material which does not form a separable slime by crushing and washing, it is frequently advantageous to effect the separation also at a further point by a primary grinding of the ore in water after crushing and separation of the slime.

Normally, the slimes removed after crushing and washing followed by screening, and also the slimes produced by primary grinding in water where this is used, require classification. In the case of the slimes obtained from crushing and washing, this classification is frequently carried on in more than one stage. Normally, a single stage of classification suffices in separating the slimes produced by primary grinding in water. The invention is in no sense concerned with any particular arrangement of classification and the number of stages and nature of the equipment will, of course, vary with the characteristics of the slimes produced which, in turn, are determined by the character of the ore. It is an advantage of the present invention that no special types of classifiers are necessary. In general, the usual types of classifiers such as rake classifiers and bowl classifiers and the like may be used. In fact, the present invention requires no special type of equipment not ordinarily used in ore dressing.

Where slimes from crushing and washing are classified in more than one stage, the sands rejected in these stages may be returned to the coarser material at various points along its travel to the cyanide plant. The particular arrangement of flow sheet will depend on the ore and on the equipment available in the plant, and other factors.

The slimes, after suitable separation and, if necessary, after adjustment of the solid content, are subjected to flotation which can be effected in any standard type of flotation machine.

The present invention greatly increases the capacity of a given cyanide plant since a considerable proportion of the ore never passes through the cyanide plant and frothing difficulties are eliminated which permit a greater mechanical efficiency for a given cyanide plant. Also, since the components of the ore, which cause cyanide, gold and lime losses in the cyanide plant, are partially or wholly removed, the chemical efficiency of the cyanide plant is materially increased. It is a further advantage of the present invention that the greatly increased mechanical and chemical efficiency of the cyanide plant is obtained without a corresponding loss, since the slimes which cause difficulty in the cyanide plant are normally readily amenable to flotation, so that they are treated in the flotation circuit under conditions which make for real flotation efficiency. A particularly striking illustration of this factor is found in the case of many of the soluble salts which cause serious lime or cyanide losses in a cyanide plant but which are actually beneficial in flotation. Because both the cyanide plant and the flotation plant are operated under very efficient conditions, the total size of a plant for treating a given amount of ore is materially reduced and the cost is likewise reduced. Representative plants embodying the present invention on Philippine gold ores are approximately one-third cheaper to build than an all cyanide plant of equal capacity, and milling and maintenance costs are markedly reduced.

The present invention should not be confused with processes which have been proposed in which all of the ore is treated by flotation and the flotation concentrates or tails are then cyanided. Such a process with the slime-forming ores for which the present invention is particularly suitable, does not give satisfactory results because the reagent cost for flotation of the total feed is excessive and tailing losses are unduly high. Apparently, the gold in the slimes is in a form which is much more amenable to flotation at moderate reagent costs.

In the present invention the two types of minerals in the precious metal ore, i. e. hard and soft, are each treated by a process which is best adapted for metallurgical efficiency on each type of mineral. Another advantage of the present invention in most of the ores tending to slime formation, lies in the fact that the slimes carry a smaller concentration of gold or other precious metal. Therefore, the removal of the slimes results in a concentration of values in the remaining sands. It is these more concentrated portions which are treated in the cyanide plant with the more expensive and more efficient equipment. The lower grade material is treated by the flotation process which is cheaper per ton and which, with this material, gives very satisfactory recoveries. This economic advantage can be utilized in various ways which will vary with the conditions of a particular mill. Thus, lower milling costs can be obtained with approximately the same or slightly higher recoveries, or the reduction in milling cost, which is brought about by removing the slimes and treating them by flotation, can be partly or wholly used in a more thorough grind of the sands or a more extensive cyanidation, thus resulting in higher recovery for approximately the same milling costs. The best compromise will, of course, be chosen by the skilled plant engineer, taking into consideration the factors of a given mill. It is an advantage of the present invention that it is very flexible and is therefore not only applicable to new mills but can be effectively utilized in improving or expanding cyanide mills which have already been constructed. The flexibility of the invention also permits varying the procedure in a given mill with different market or ore conditions.

The present invention is not limited to any particular flotation reagents, the usual xanthates with pine oil or other frothers giving satisfactory results. Other collectors may, of course, be used such as dithiophosphates.

The invention will be described in detail in connection with the drawings in which:

Fig. 1 is a flow sheet of a process embodying the present invention; and

Fig. 2 is a modified flow sheet providing preliminary grinding of sands prior to final grinding in cyanide solution.

Fig. 1 is a flow sheet showing the flotation of a typical ore mined at Benguet Consolidated Mining Company in the Philippines. The original ore carrying about $15.80 of gold per ton, is screened, crushed in a jaw crusher and again screened, the coarse ore being fed to a cone crusher, and the slimes and fine ore to a classifier. The underflow of the classifier joins the ground coarse ore from the cone crusher and is then given a primary grinding in a ball mill. The slimes or overflow are transferred to a bowl classifier from which the dragover joins the discharge from the primary ball mills and is subjected to secondary grinding in cyanide solution. The bowl classifier overflow which is 90% below 200 mesh and which contains about $9.10 work of gold per ton, is then thickened to 13% solids and floated in a string of standard Fagergren flotation machines in a circuit having a pH between 6.6 and 6.8 (obtained, if necessary, by adding sulfuric acid). .05 lbs. of secondary butyl xanthate is added with the sulfuric acid and the pulp, after conditioning, flows into flotation cells where .2 lb. per ton of pine oil is added as a frother. The tails, which contain approximately 93 cents of gold, are discharged to waste and the concentrates carrying about $129.00 of gold per ton are reground in cyanide in the secondary grinding circuit before passing through the remainder of the cyanide plant which is of standard design and uses a solution containing approximately 1.34 lbs. NaCN equivalent and 1.34 lbs. CaO per ton. A tail of slightly over a dollar is obtained. The capacity of the cyanide plant is increased about 50% and all frothing troubles are eliminated.

The above description applies to a modification of the invention in which slimes are removed only after crushing and washing and represents the first method of application of the present invention to Benguet ore. With this particular ore, still further savings are being effected by giving the crushed ore after slime separation and the sand from the first classifier a preliminary grind in water followed by separation of sands and slime in an additional bowl classifier, the overflow going to the flotation circuit and the sands being ground and cyanided. This modified procedure which is illustrated in Fig. 2 not only still further decreases the amount of slimes and soluble salt present in the cyanide plant, but an enrichment or concentration of the gold values in the sands which are treated in the cyanidation plant is effected, due to the fact that the slimes formed in the primary grind in water have a lower gold content than the material fed into the primary grinding circuit.

The use of the present invention as described above at the mill of the Benguet Consolidated Mining Company at Baguio, P. I., resulted in increasing the mechanical capacity of the cyanide plant from 485 to 778 tons per day. Frothing is less at the higher capacity than formerly at the lower capacity. Losses through froth are entirely eliminated and the actual amount of froth at 778 tons is only one tenth of what it used to be on 485 tons before the plant was remodeled to incorporate the present invention. The life of filter covers in the cyanide plant was approximately doubled; solution pump life quadrupled, and the milling costs reduced more than 25%. Lime consumption was decreased from approximately 15 lbs. per ton to about 6 lbs. per ton. A saving of one-tenth lb. NaCN equivalent per ton of ore was also effected.

While the present invention is particularly effective with slimey ores which cause serious frothing trouble in the cyanide plant, it may, of course, be applied to ores which can be directly cyanided and the advantages of the present invention in increased cyanide plant capacity and better metallurgy are obtained, although, of course, they are not so marked as with ore which slimes badly.

The invention has been described in conjunction with ores where flotation and concentration is amenable to cyanidation. This is the preferred embodiment of the invention but with some ores it may be desirable to adopt other methods of recovering the values from the flotation concentrate. This is particularly true where the softer type of minerals may contain metals other than the precious metals which would render cyanidation of the flotation concentrate uneconomical.

I claim:

1. A method of treating precious metal ores which contain both hard and soft types of minerals which comprises separating at least a portion of the softer type minerals from the ore, treating this separated portion by a process including flotation, and treating the portion of the ore containing the harder type minerals by cyanidation and recovering values from the flotation concentrate.

2. A method of treating precious metal ores which contain both hard and soft types of minerals, which comprises separating at least a portion of the softer type minerals from the ore, treating this separated portion by a process including flotation and treating the portion of the ore containing the harder type minerals together with the flotation concentrates by cyanidation, and recovering values from the flotation concentrate.

3. A method of treating precious metal ores which contain minerals tending to form slimes, which comprises crushing and washing the ore, separating slimes, classifying the slimes, floating the classified slimes with a flotation reagent capable of floating precious metals and subjecting the coarser portions of the crushed ore, the sand from classification of the slimes and the flotation concentrates to cyanidation.

4. A method of treating precious metal ores which contain minerals tending to form slimes, which comprises crushing and washing the ore, separating slimes, floating the slimes with a flotation reagent capable of floating precious metals and subjecting the coarser portions of the crushed ore and the flotation concentrates to cyanidation.

5. A method of treating precious metal ores which contain minerals tending to form slimes on crushing and grinding, which comprises crushing and washing the ore, separating the slimes from the coarse portions, subjecting the coarse ore to at least one stage of a preliminary grinding in water with concomitant production of slimes, separating the slimes thus produced, floating the slimes with a flotation reagent capable of floating precious metals and subjecting the sands from the preliminary grinding as well as the flotation concentrates to cyanidation.

6. A method of treating precious metal ores which contain minerals tending to form slimes on crushing and grinding, which comprises crushing and washing the ore, separating the slimes from the coarse portions, subjecting the coarse ore to at least one stage of a preliminary grinding in water with concomitant production of slimes, separating the slimes thus produced, classifying the slimes, floating the classified slimes with a flotation reagent capable of flotation of precious metals and subjecting the sands from the preliminary grinding and from slime classification as well as the flotation concentrates to cyanidation.

7. A method according to claim 5 in which at least a portion of the sands from the slime classification are subjected to the preliminary grinding in water.

8. A method according to claim 6 in which at least a portion of the sands from the slime classification are subjected to the preliminary grinding in water.

JEPHTHAH M. MORRIS.